(12) United States Patent
Kozodoy

(10) Patent No.: US 8,451,550 B2
(45) Date of Patent: May 28, 2013

(54) PROJECTION LENS

(75) Inventor: Valery Vasilievich Kozodoy, Mga (RU)

(73) Assignee: Zakrytoe Akcionernoe Obshchestvo "Impul's", Saint Petersburg (RU)

( * ) Notice: Subject to any disclaimer, the term of this patent is extended or adjusted under 35 U.S.C. 154(b) by 0 days.

(21) Appl. No.: 13/456,460

(22) Filed: Apr. 26, 2012

(65) Prior Publication Data
US 2012/0206823 A1    Aug. 16, 2012

Related U.S. Application Data

(63) Continuation of application No. PCT/RU2011/000125, filed on Mar. 2, 2011.

(30) Foreign Application Priority Data

Apr. 26, 2010  (RU) .............................. 2010116303

(51) Int. Cl.
*G02B 9/60*         (2006.01)
(52) U.S. Cl.
USPC .......................................... 359/770; 359/649
(58) Field of Classification Search
USPC ................... 359/648–651, 754, 770, 784
See application file for complete search history.

(56) References Cited

U.S. PATENT DOCUMENTS 5,930,049 A * 7/1999 Suenaga et al. ............... 359/650

FOREIGN PATENT DOCUMENTS

| JP | 9236766 A | 9/1997 |
|---|---|---|
| JP | 2007047334 A | 2/2007 |
| RU | 2225628 C2 | 3/2004 |
| SU | 1642426 A1 | 4/1991 |

OTHER PUBLICATIONS

International Search Report mailed Sep. 6, 2011 from Corresponding International application No. PCT/RU2011/000125, filed on Mar. 2, 2011.

* cited by examiner

*Primary Examiner* — Scott J Sugarman
(74) *Attorney, Agent, or Firm* — Patentbar International P.C.

(57) ABSTRACT

The projection lens comprises: the first of the components of negative power, facing with its concave surface to the object and cemented of negative and positive menisci, the second component comprising a positive meniscus, having the concave surface facing an object side, the third one being a biconvex lens, the forth one being a positive meniscus, having the concave surfaces facing an image side, the fifth one being negative, faced with its concave surface to the image and being cemented of biconvex and biconcave lenses. The technical objective is that relative aperture (1:1.8) is increased, brightness at the image edge field is enhanced against that in the centre (0.91), in the image, formed by the lens, the required value of negative distortion is provided (−3%), an image quality is enhanced, conditions of lens operating are provided for the object, located at the finite distance.

4 Claims, 2 Drawing Sheets

PROJECTION LENS

RELATED APPLICATIONS

This Application is a Continuation application of International Application PCT/RU2011/000125 filed on Mar. 2, 2011, which in turn claims priority to Russian application No. RU2010116303 filed on Apr. 24, 2010, both of which are incorporated herein by reference in their entirety.

FIELD OF THE INVENTION

The present invention relates to optical instruments engineering, specifically to projection lenses and can be used, for instance, in image transfer devices, formed on an output window of an X-ray image intensifier or other image intensifier to a CCD matrix.

BACKGROUND OF THE INVENTION

High-aperture hydrolens with the remote entrance pupil is known (certificate of authorship SU1642426A1, published on 15.04.1991, bull. No. 14), composed of remote entrance pupil in front of the projection lens and six lenses sequentially arranged along the pathway of the optical radiation from the object to the image, the first and the third of the lenses are positive menisci, having the concave surfaces facing an object side, second lens is a negative meniscus, having the concave surface facing an object side, the forth and the fifth lenses are biconvex, and the sixth one is biconcave, where the fifth and the sixth lenses are cemented together.

This projection lens has the following advantages: a remote entrance pupil in front of the lens, satisfactory image size. However, its relative aperture size is not sufficient, and light distribution in an image is poor, insufficient image quality, as well as the condition of its application, that is the operation in finitely conjugates mode, that are placed to the aqueous media.

A projection lens with a remote entrance pupil is known from the invention patent (RU2225628C2, published on 10.03.2004), composed of four optical components, sequentially arranged along the pathway of the optical radiation from the object to the image, the first of which is negative power, having the concave surfaces facing an object side and comprising biconcave and biconvex lenses being cemented together, the second component is biconvex, the third is positive power, having the concave surfaces facing an image side, and comprising biconvex and biconcave lenses being cemented together, the forth one is negative meniscus, having the concave surfaces facing an object side.

The advantages of this projection lens are: large image size, small dimensions, a remote entrance pupil in front of the projection lens.

The disadvantages of this lens are: low ratio of brightness of the edge of the image against the brightness in the centre of the image, low size of relative aperture, the value of negative distortion that is insufficient for correction of positive distortion of X-ray image intensifier, operating of projection lens with an infinitely remote object, insufficient image quality.

SUMMARY OF THE INVENTION

In the claimed lens, the overall technical objective is reached: relative aperture increase, improvement of brightness at the edge of field of view against that in the centre, provision of the required value of negative distortion in the image formed by the projection lens, the image quality is improved (the minimal value of modulation is increased for any point of the field of view at the spatial frequency), operating condition of the lens with an object, located at the finite distance, is provided.

The technical objective for the projection lens, comprising sequentially arranged along the pathway of the optical radiation from the object to the image remote entrance pupil, first negative component, cemented of two lenses and having the concave surfaces facing an object side, the second positive component, the third component having the concave surfaces facing an image side and cemented of biconvex and biconcave lenses, is achieved with that the first component is cemented of negative and positive menisci, the second component is a positive meniscus, having the concave surfaces facing an object side, the third component is negative, and two extra positive lenses are inserted between the second and the third component, the first of which is biconvex, and the second one is meniscus, facing with its concave surface to the image.

BRIEF DESCRIPTION OF DRAWINGS

The essence of the invention and the potential of its commercial application is illustrated by the instance of the specific embodiment, that is shown in FIG. 1-4.

As shown in FIG. 1, along the pathway of the optical radiation from the object 9 to the image 10 lens contains sequentially located entrance pupil 1, first negative component, having the concave surfaces facing an object side and cemented of negative 2 and positive 3 menisci, the second component 4 being a positive meniscus, having the concave surfaces facing an object side, then third negative component, having the concave surfaces facing an image side and cemented from the two lenses, biconvex 7 and biconcave 8, and between the second component 4 and the third component 7, 8 two additional positive lenses are located, where the lens 5 is biconvex, and the lens 6 is a meniscus, having the concave surfaces facing an image side.

FIG. 2 shows a frequency-contrast curves of the claimed lens for the spectral range from 500 nm to 600 nm with the fundamental wavelength of 575 nm, that characterizes the value of contrast ratio (T), depending on the spatial resolution in the image for two fields of view: the centre, 0.7 of the maximal field of view and the maximal field of view, where for 0.7 of maximal and the maximal field of view is represented by two curves, for meridional and sagittal sections. Vertical axis T characterizes the value of contrast (modulation) ratio, horizontal axis N, line pairs/mm, characterizes the spatial resolution in image in terms of line pairs per mm The plot shows five curves, where curve 1 represents the center of the field of view (object size is 0 mm), curves 2S and 2T represent 0.7 of the field of view (object size is 10.5 mm), curves 3S and 3T represent the edge of the field of view (object size is 15 MM), where letter S attributes the curves to sagittal section, and letter T attributes to the meridional section of broad ray beams.

FIG. 3 shows a curve, that characterizes the lens by the image relative brightness, depending on the object size. Vertical axis RI defines the value of relative brightness, horizontal axis defines the object size Y in mm The plot shows, that at the Y object size equal to 15 mm, brightness of the image is 0.91 from the center of the field of view (Y is equal to 0 mm), where the relative brightness is maximal and is equal to 1.

FIG. 4 shows the plot of image distortion depending on the object size for design variant of lens. Vertical axis Y allows to keep the high image quality across the entire field of view, along with simultaneous increase of object size in mm Horizontal axis D specifies a value of image distortion expressed as percentage. The plot shows, that the maximal value of image distortion is 3% for the edge of the field of view of 15 mm, that allows to compensate for the positive distortion of the X-ray image intensifier.

DETAILED DESCRIPTION

Figure 1:
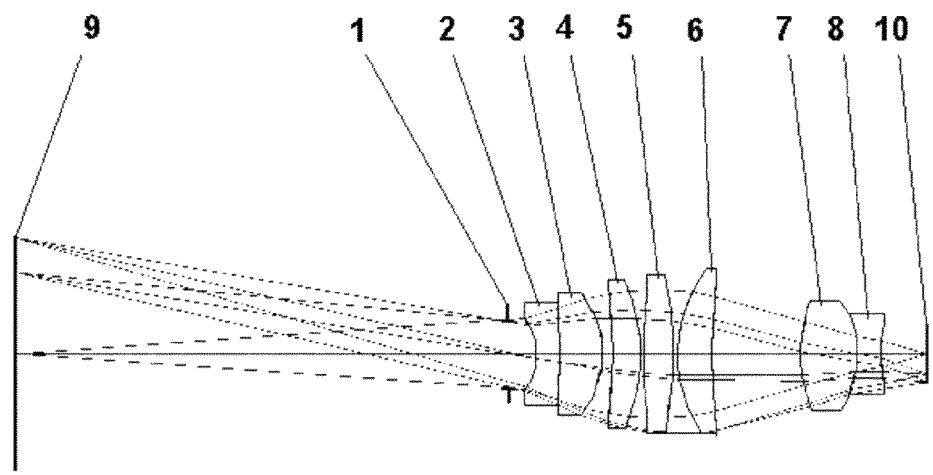
FIG. 1 shows the optical train of the proposed lens arrangement.
Figure 2:
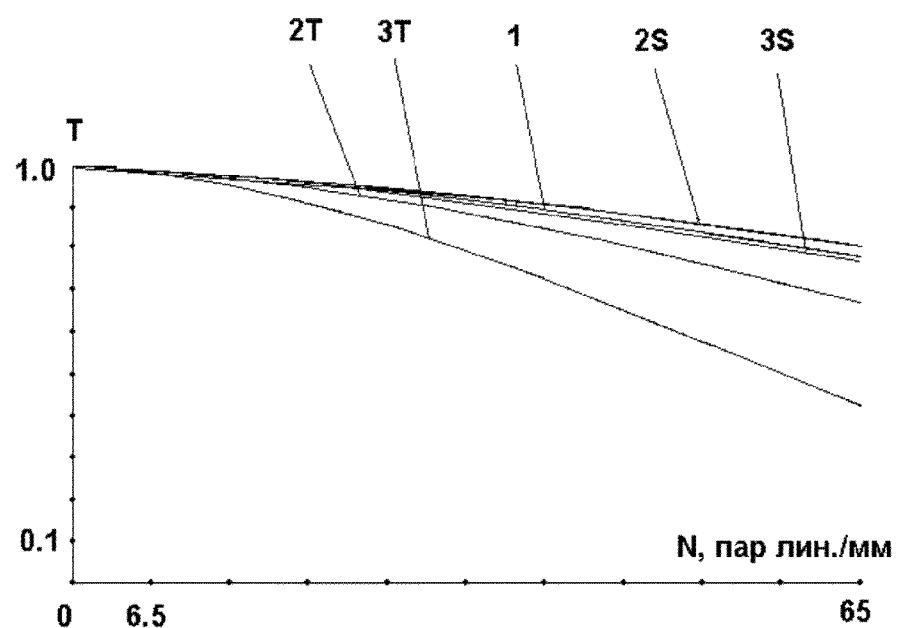
FIG. 2 shows frequency-contrast curves for the projection lens.
Figure 3:
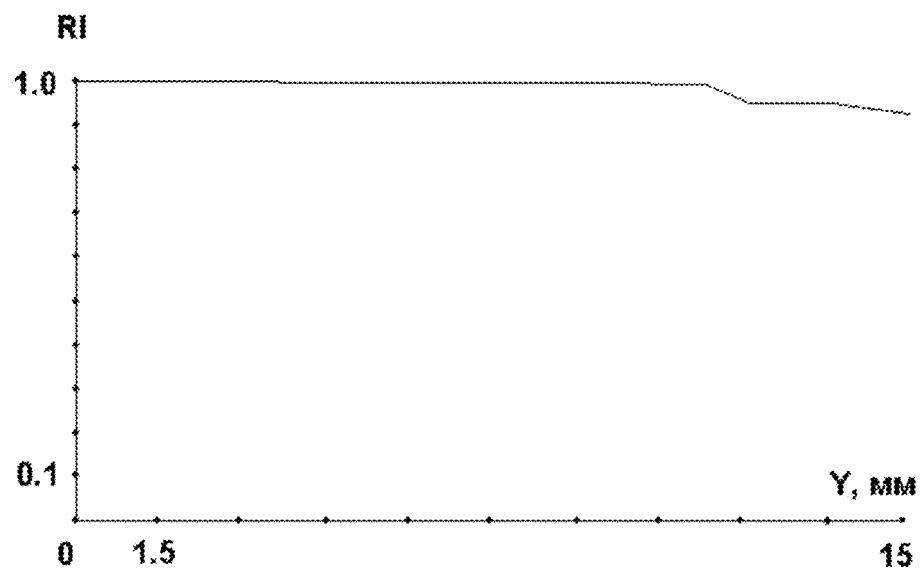
FIG. 3 shows a plot of the image against brightness, depending on the object size.
Figure 4:
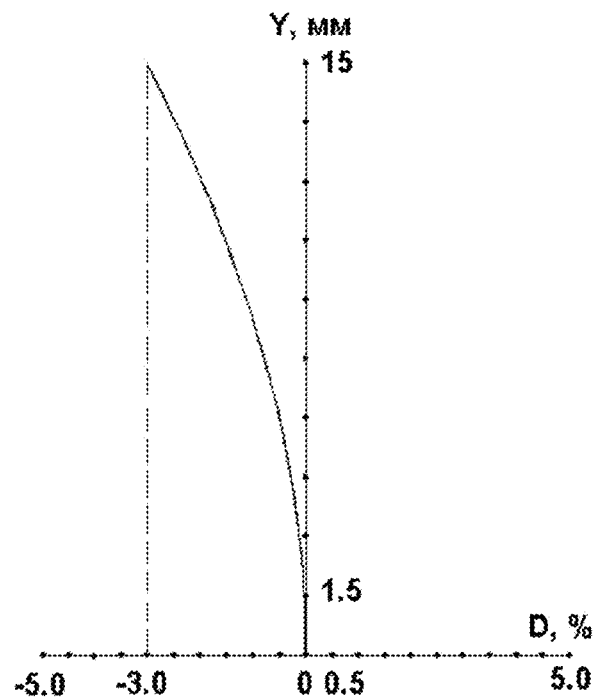
FIG. 4 shows the plot of image distortion depending on the object size.

The lens operates as the follows: an optical radiation from the object 9, sequentially passes through the entrance pupil 1, defining the size of relative aperture, through lenses 2-8, and are focused in the image 10. As the image receiver, a CCD matrix, photofilm, and etc., can be applied.

Realization of negative lens having the concave surfaces facing an object side, cemented of negative 2 and positive 3 menisci, and, simultaneously, lenses of negative power, having the concave surfaces facing an image side, cemented from biconvex 7 and biconcave 8 ones, that allowed to enhance the correction of chromatic aberrations, spherical aberration, astigmatism and curvature of the field of view. Realization of lens 4 being a positive meniscus, having the concave surfaces facing an object side, insertion of extra positive lens 5, that is biconvex, and lens 6 having a shape of meniscus, facing with their concave surface to an image, allowed to elaborate the relative aperture, upon condition of reduction of high order aberrations. The totality of the described actions, along with the simultaneous transitions of lens to the operating conditions in the projection, resulted in a possibility to reduce vignetting and, therefore, improve a distribution of brightness of the entire image field, and at its edge. However, the relative offset of entrance pupil was increased (ratio of removal of entrance pupil of the first lens to lens focus), which is 7/50=0.14 for the prototype, and for lens is 5/14.7=0.34 for the claimed one.

INDUSTRIAL APPLICABILITY

The invention can be used, for instance, in image transfer devices, where the image is formed on the output window of the X-ray image intensifier or other image intensifier based on a CCD matrix. Owing to the claimed embodiment of lens, the relative aperture is increased (from 1:12 according to the prototype to 1:1.8 according to the claimed solution), brightness at the image edge field in relation to the center is enhanced (from 0.85 according to the prototype, to 0.91 according to the claimed solution). In the image, formed by the projection lens, the required value of negative distortion is provided (from 1.7% according to the prototype to −3% according to the claimed solution). The image quality is enhanced (at spatial frequency 65, the value of minimal modulation for any point of the field of view is 0.13 line pairs /mm according to the prototype, and 0.42 according to the claimed solution). The conditions of lens operating, when an object is located at the finite distance (a paraxial linear magnification factor is −0.25), is provided.

What is claimed is:

1. A projection lens comprising:
    a remote entrance pupil,
    a first negative component comprised of two lenses and having its concave surfaces facing an object side,
    a second positive component comprised of a positive meniscus having its concave surfaces facing the object side,
    a third negative component comprised of a biconvex and a biconcave lenses and having its concave surface facing an image side,
    all sequentially arranged along a pathway of optical radiation from the object to the image;
    wherein the first component is comprised of a negative and a positive menisci, and
    wherein
        a first positive lens and a second positive lens are disposed between the second component and the third component,
        the first positive lens being biconvex, and
        the second positive lens being a meniscus with its concave surface facing the image.

2. The projection lens of claim 1, wherein the space between the second component and the third component is substantially free of optical components.

3. The projection lens of claim 1, wherein the two lenses of the first negative component are glued together.

4. The projection lens of claim 1, wherein the two lenses of the third negative component are glued together.

* * * * *